Feb. 21, 1928.

L. DE FOREST 1,659,909

FILM PROTECTING ARRANGEMENT

Filed Nov. 18, 1922

INVENTOR
Lee de Forest
BY his ATTORNEYS Darby & Darby

Patented Feb. 21, 1928.

1,659,909

UNITED STATES PATENT OFFICE.

LEE DE FOREST, OF NEW YORK, N. Y., ASSIGNOR, BY MESNE ASSIGNMENTS, TO DE FOREST PHONOFILM CORPORATION, OF JERSEY CITY, NEW JERSEY, A CORPORATION OF DELAWARE.

FILM-PROTECTING ARRANGEMENT.

Application filed November 18, 1922. Serial No. 601,929.

This invention relates to means for protecting moving films on which are recorded, photographically or otherwise, pictures or the like.

The object of the invention is to provide means which are simple, economical and efficient for protecting the surfaces of films which are moved for reproduction purposes, more particularly such portion of the surfaces on which sounds, views or the like have been photographically or otherwise recorded.

Other objects of the invention will appear more fully hereinafter.

The invention consists substantially in the construction, combination, location and relative arrangement of parts, all as will be more fully hereinafter set forth as shown by the accompanying drawing and finally pointed out in the appended claim.

Referring to the drawings.

The same part is designated by the same reference character wherever it occurs throughout the several views.

My invention is primarily directed to the provision of means for protecting that portion of a film on which is, photographically or otherwise, recorded the scene, sound or the like, that it is desired to at a later time reproduce. Inasmuch as the film is in the projection camera, and is compelled to move past stationary parts, the friction of the film therewith results in marring the film, with the resulting injury to the record contained thereon. This is especially true where an endless film arrangement is employed such as is shown and described in my Patent No. 1,365,237, granted January 11, 1921, where one portion of the film is compelled to move faster than other portions thereof and the coils of the film are in contact with each other.

While I have shown, and will now described, my invention as applied to an endless film arrangement of this type, I do not desire to be limited or restricted thereto as it is apparent that the principles of my invention may be readily applied for the protection of any type of moving film.

Figure 1:
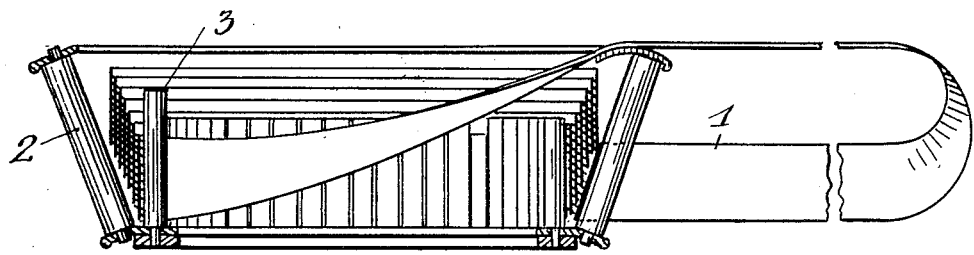
Figure 1 is a central vertical section of an endless film pan which may be employed in accordance with my invention.
Figure 2:
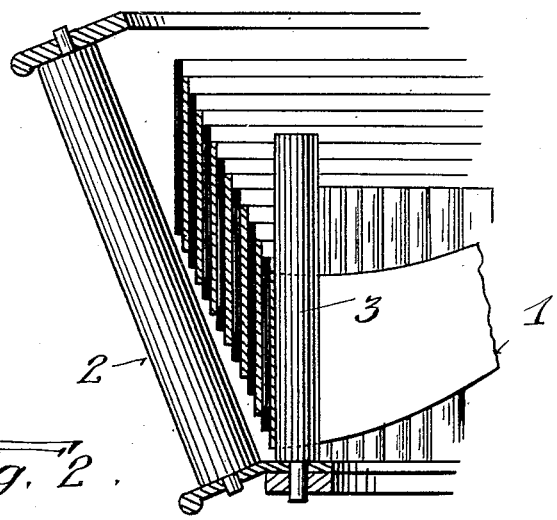
Fig. 2 is an enlarged fragmentary detail view, likewise in central longitudinal section, showing my present invention as applied to an endless film pan.
Figure 4:
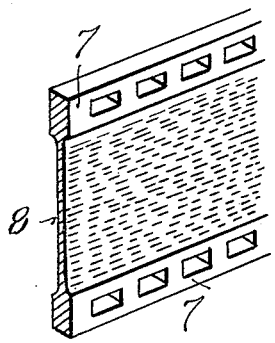
Fig. 4 is a modified arrangement for accomplishing the same purposes.

In my United States patent, above identified, however, and as shown in Fig. 1 in the present case, I have shown an arrangement for coiling and uncoiling an endless film wherein the roll of film 1 rests in a conical formation or pan upon suitably inclined rollers 2. The rollers 2 cooperate with vertical rollers 3 to form a substantially V-shaped recess therebetween, in which recess the film 1 is coiled, as clearly shown. In this arrangement the film is drawn out from the inside of the coil and fed on to the outside of the coil so that the sections of the coil are always traveling inward and downward to the inner portion thereof. By this arrangement there is necessarily a slippage at all points of the coil, the outer sections traveling faster relative to the inner sections, although the linear speed of the sections of the film is necessarily the same. This slippage of the film, as above stated, will in time produce scratches which impair the character of the record photographed thereon. To avoid this, I have suggested, and have previously employed an endless silk ribbon which is positioned between each two consecutive layers of the film. When this ribbon is itself flat it will in time collect dust and permit as a result thereof, the injurious scratching of the film.

In accordance with my present invention I provide means to ensure that the main surface of the film, i. e., the portion thereof on which the record is photographed, is never in contact with any object and therefore can be used indefinitely without damage by scratching.

Figure 3:
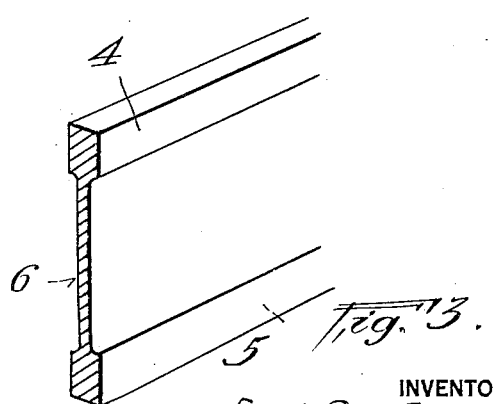
Fig. 3 is an enlarged view in perspective of means for protecting the film in accordance with my invention.

In accordance with my present invention, I provide a ribbon which is illustrated in Fig. 3 which consists substantially of ribs 4 and 5 with a body 6 of reduced thickness relative to the ribs extending therebetween. The shape of the ribs 4 and 5 may be any desired shape and, likewise, the size may be varied at will in accordance with the size of the film on which is photographed the record. With this arrangement it will readily be seen that the portion of the film on which the record is photographed is at all times maintained out of contact with any moving or stationary body, and the marginal edge of the film is the only portion of the film which comes in contact with any moving or stationary body. Instead of using such a ribbon the film itself can be made in such form that the two edges 7 thereof alone can rub against each other when the film is coiled as shown in Fig. 1, or utilized in the usual way in connection with motion picture photography.

In this arrangement the other or narrow portion of the film 8 can never come in contact with any body and this portion alone carries the photographic record thereon.

An endless film having its substantial cross section or the plain film having uncoiled with it or used in connection with it a silk ribbon having the cross section along the lines herein set forth, can be used indefinitely without any scratching whatever and therefore without its consequent impairment of the record thereon.

As above stated, many modifications and changes in shape, size and other details will readily occur to those skilled in the art without departing from the spirit and scope of my invention, but having shown and described a construction embodying the principles thereof, what I claim as new and useful and of my own invention and desire to secure by Letters Patent is:

Means for protecting the record portions of films or the like comprising means independent of the film to offset the record portion of the film from contact with any stationary or moving part, comprising a strip of material substantially I-shaped in cross-section.

In testimony whereof I have hereunto set my hand on this 17th day of November A. D., 1922.

LEE DE FOREST.